(12) United States Patent
Harris

(10) Patent No.: US 7,097,430 B2
(45) Date of Patent: Aug. 29, 2006

(54) INJECTION MOULDING OF PLASTIC FANS

(75) Inventor: Richard Harris, Emerald (AU)

(73) Assignee: Australian Fan & Motor Co. Pty. Ltd., Victoria (AU)

( * ) Notice: Subject to any disclaimer, the term of this patent is extended or adjusted under 35 U.S.C. 154(b) by 0 days.

(21) Appl. No.: 10/486,033

(22) PCT Filed: Mar. 21, 2002

(86) PCT No.: PCT/AU02/00326

§ 371 (c)(1),
(2), (4) Date: Aug. 6, 2004

(87) PCT Pub. No.: WO2003/009994

PCT Pub. Date: Feb. 6, 2004

(65) Prior Publication Data

US 2004/0253111 A1 Dec. 16, 2004

(30) Foreign Application Priority Data

Jul. 23, 2001 (AU) .................................. PR6543

(51) Int. Cl.
F01D 5/08 (2006.01)
B29C 45/00 (2006.01)

(52) U.S. Cl. .............. 416/229 R; 416/234; 416/241 R; 425/438; 264/45.3

(58) Field of Classification Search ................ 416/234, 416/241 A, 229 R, 230; 425/438, 443, DIG. 58; 264/45.3, 51, 328.7
See application file for complete search history.

(56) References Cited

U.S. PATENT DOCUMENTS

| 1,430,561 A | * | 10/1922 | Kempton et al. | ........... 416/230 |
| 2,542,251 A | * | 2/1951 | Hueglin | ....................... 416/234 |
| 2,974,502 A | * | 3/1961 | Radcliffe | ................ 416/134 R |
| 3,264,016 A | * | 8/1966 | Reisch | .................... 416/134 R |
| 5,076,760 A | | 12/1991 | Weetman et al. | |
| 6,010,305 A | * | 1/2000 | Hauser | .................... 416/169 A |
| 6,378,322 B1 | * | 4/2002 | Calvert | ....................... 416/207 |

FOREIGN PATENT DOCUMENTS

| JP | 53-024611 A | 3/1978 |
| JP | 56-010439 A | 2/1981 |
| JP | 11-277583 A | 10/1999 |

OTHER PUBLICATIONS

Derwent Abstract Accession No. 84-292651/47 (Tokyo Shibaura Denki KK), JP 099439, Aug. 20, 1976.
International Search Report for PCT/AU02/00326; ISA/AU; Mailed: May 10, 2002.

* cited by examiner

Primary Examiner—Igor Kershteyn
(74) Attorney, Agent, or Firm—Harness, Dickey & Pierce, PLC

(57) ABSTRACT

A method of manufacturing a fan from a plurality of fan blades (12), comprising the steps of: providing an injection moulding tool (30) which defines a fan hub section (14); assembling a predetermined number of preformed fan blades with the injection moulding so that inner ends (16) of said blades extend into moulding cavities (32) within the tool, injecting synthetic plastics material into the tool, and allowing the injected material to cool or cure to thereby form a moulded hub with the inner ends of the blades bonded therein.

17 Claims, 8 Drawing Sheets

INJECTION MOULDING OF PLASTIC FANS

CROSS REFERENCE TO RELATED APPLICATIONS

This application is a US National Stage of International Application No. PCT/AU02/00326 filed 21 Mar. 2002. This application claims the benefit of Australian Application No. PR 6543, filed 23 Jul. 2001. The disclosure(s) of the above applications are incorporated herein by reference.

BACKGROUND

This invention relates to improvements in fans and relates particularly to improvements in axial fans wherein a plurality of fan blades extend radially from a hub.

Fans are commonly formed of synthetic plastics material by injection moulding. An injection moulding tool is made which defines the shape configuration and structural features of the moulded fan. However, the cost of injection moulding tools is extremely high and a different tool is required for fans of different shapes, sizes, blade pitch angles, number of blades, hub structures and shapes and the like.

While it is known to manufacture fans using an assembly process where individual blades are attached to a hub by a fastener or the like, such processes are relatively expensive due to the handling and assembly time.

It is therefore desirable to provide an improved fan structure which obviates at least some of the disadvantages of the existing fans.

It is also desirable to provide an improved method of manufacturing a fan which obviates disadvantages of existing manufacturing methods.

It is also desirable to provide an improved method of manufacturing a fan which facilitates varying the fan characteristics.

It is also desirable to provide an improved fan manufacturing process which is relatively simple and is economical.

It is also desirable to provide an improved fan manufacturing method which produces a single piece fan.

It is also desirable to provide a method of manufacturing fans of different sizes, configurations and with different properties using standard components.

SUMMARY

According to one aspect of the invention there is provided a method of manufacturing a fan from a plurality of fan blades, comprising the steps of:

providing an injection moulding tool which defines a fan hub section;

assembling a predetermined number of preformed fan blades with the injection moulding tool so that inner ends of said blades extend into moulding cavities within the tool;

injecting synthetic plastics material into the tool; and allowing the injected material to cool or cure to thereby form a moulded hub with the inner ends of the blades bonded therein.

The blades can be formed of any desired shape and may be formed of any suitable material. It is important, however, that the inner ends of the blades are formed to be received within the injection moulding tool and to be able to be keyed into the moulded hub such that the blades cannot be removed therefrom once the injected synthetic plastics material is cured or set.

Blades may be preformed by moulding from synthetic plastics material, and may be formed with a predetermined pitch angle and length which defines the characteristics of the fan to be formed. Thus, the inner end of the preformed blades may be received in a fixed orientation within the injection moulding tool and the blade shape defining the pitch angle and diameter of the fan.

Alternatively, the fan blades may be preformed and assembled with the injection moulding tool in such a way that the blade orientation is able to be adjusted relative to the tool to define a predetermined pitch angle. With this arrangement, standard blades may be used to manufacture fans having different blade pitch angles by varying the orientation.

In an alternative arrangement, a jig may be used to receive the injection moulding tool and the assembled blades, the jig determining the particular pitch angle for a particular fan design. With this arrangement, different jigs are able to be used for varying the blade orientation within the injection moulding tool.

The jig may include a plurality of blade orientation members to orient each blade in a desired pitch angle with respect to the injection moulding tool.

The jig may include a plurality of blade support members to support each blade inner end in fixed relation to the injection moulding tool.

The inner end of each blade is shaped to be received within the injection moulding tool and to be keyed into the hub section, when formed, to securely support and retain the blade in the predetermined position. Any suitable form of key structure may be used on the inner end of the preformed blades.

According to another aspect of the invention there is provided a fan comprising a plurality of fan blades inner ends of which are bonded within and encapsulated by a hub section form by injection moulding of synthetic plastics material, the pitch angle of the blades being selected as desired prior to encapsulation.

In one embodiment, the blades are preformed with a predetermined pitch angle and/or length so as to define predetermined characteristics of the fan. The inner end of each blade is formed with a key structure which engages in a mating cavity in an injection moulding tool forming the hub. The key structure may locate the blade in a predetermined position and each individual blade sits in assembly with the injection moulding tool at a same predetermined angle. In this embodiment, variation of blade pitch angle is provided by having a plurality of different blade forms for each desired angle and fan diameter.

The tool may define the fan hub section and include moulding cavities for receiving the inner ends of the blades.

The jig may act to support the injection moulding tool and include members for supporting and/or orienting the fan blade in relation to the injection moulding tool.

The jib members may include blade support members for supporting the fan blades in fixed relation to the injection moulding tool.

The jib members include blade orientation members for orienting the fan blades in a desired pitch angle with respect to the injection moulding tool.

In order that the invention is more readily understood one embodiment thereof will now be described with reference to the accompanying drawings wherein:

DRAWINGS

DETAILED DESCRIPTION

Figure 1:
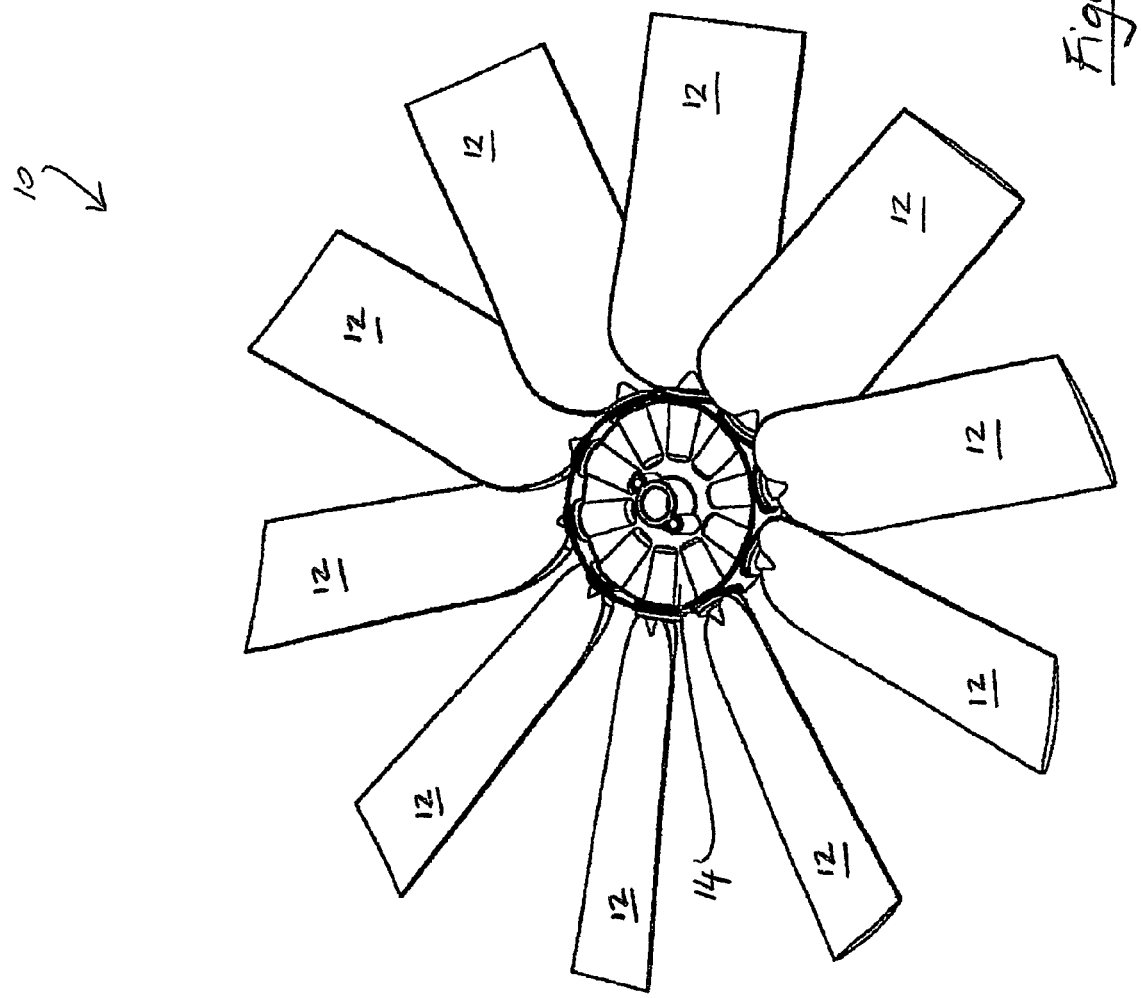
FIG. 1 is a perspective view of a fan made in accordance with one embodiment of the present invention.

Referring now to FIG. 1, there is shown a fan 10 having a unitary structure formed of a plurality of fan blades 12 (ten in number in this embodiment) integral with a hub 14. The blades 12 are preferably formed as separate, individual blade units and may be moulded from synthetic plastics material or formed of any other suitable blade material, including metal.

Figure 2:
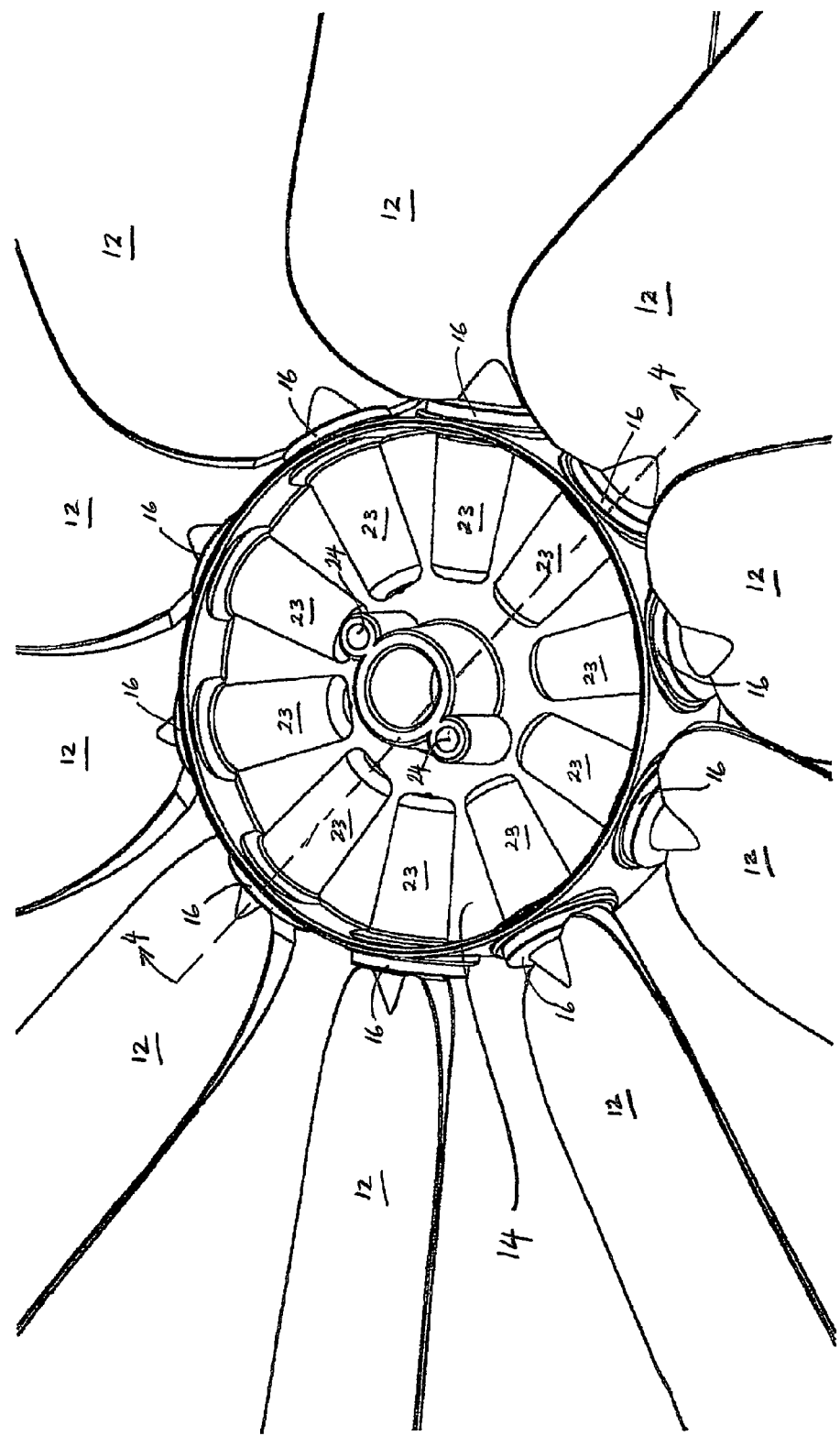
FIG. 2 is an enlarged perspective view of the hub section of the fan of FIG. 1.
Figure 3:
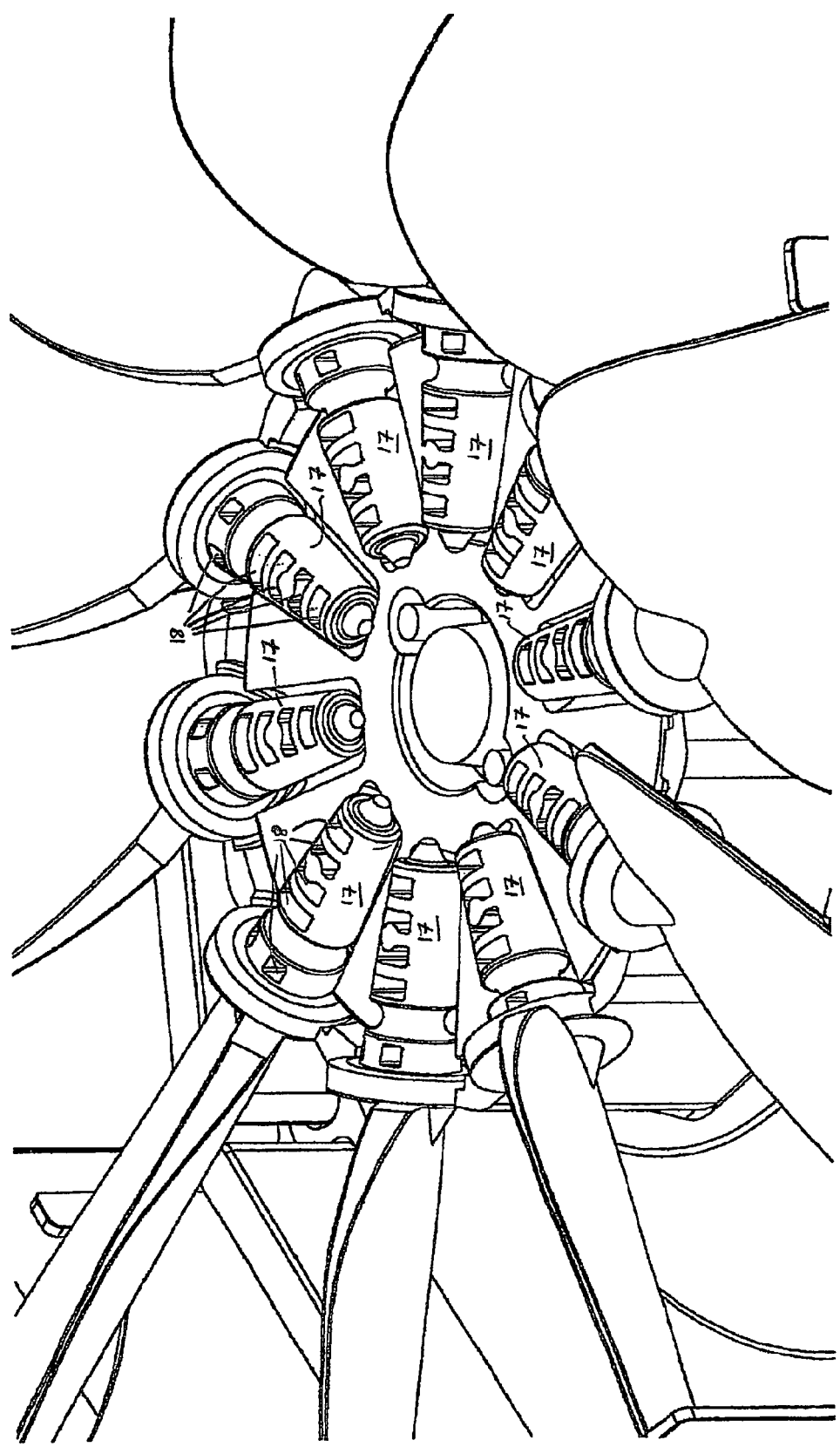
FIG. 3 is a perspective view of the hub section of FIG. 2 prior to encapsulation of the fan blades.

As will be better appreciated from FIGS. 2 and 3, the hub 14 is moulded of synthetic plastics material in one piece. Inner ends 16 of the individual blades 12 are bonded to and encapsulated by the material of the hub 14 during its moulding process. Each inner end, as shown in FIG. 4, comprises a key 17 of tapered or substantially V-shaped cross-section.

As can be seen in FIG. 3, each key 17 includes one or more apertures 18 formed therein. The shape of the key and, in this example the apertures, is such as to enable synthetic plastics material of the hub to flow around and into the key during the moulding process and to securely lock and encapsulate the key within the hub.

Figure 4:
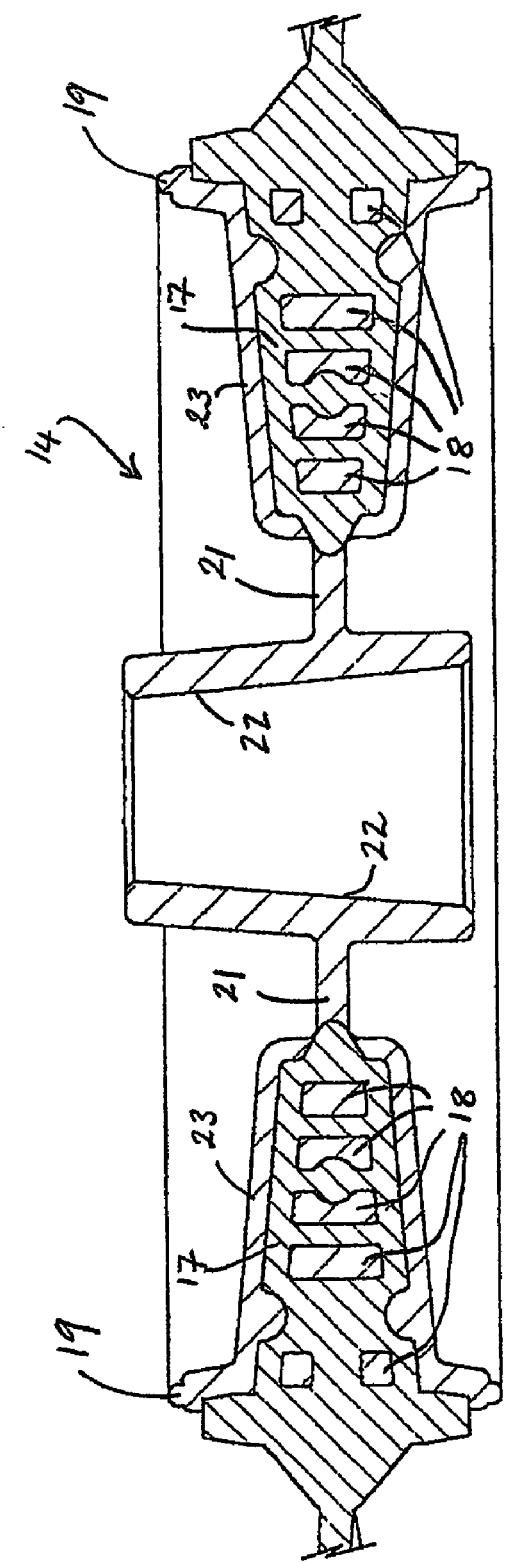
FIG. 4 is a cross-sectional view of the hub taken along the lines 4—4 in FIG. 2.

FIG. 4 illustrates the structural features of the hub 14 which include a circumferential outer wall 19 a substantially planar, annular top wall 21 and a tapered inner wall 22 by which the fan 10 is adapted to be engaged with a taper on a shaft by which the fan is to be driven. The top wall 21 is formed with a plurality of plugs 23 aligned with each blade location, the plugs acting to lock and encapsulate the keys 17 within the hub 14. Two securing holes 24 (see FIG. 2) are formed adjacent the inner wall 22 to facilitate securing the fan 10 to the driving shaft.

Figure 5:
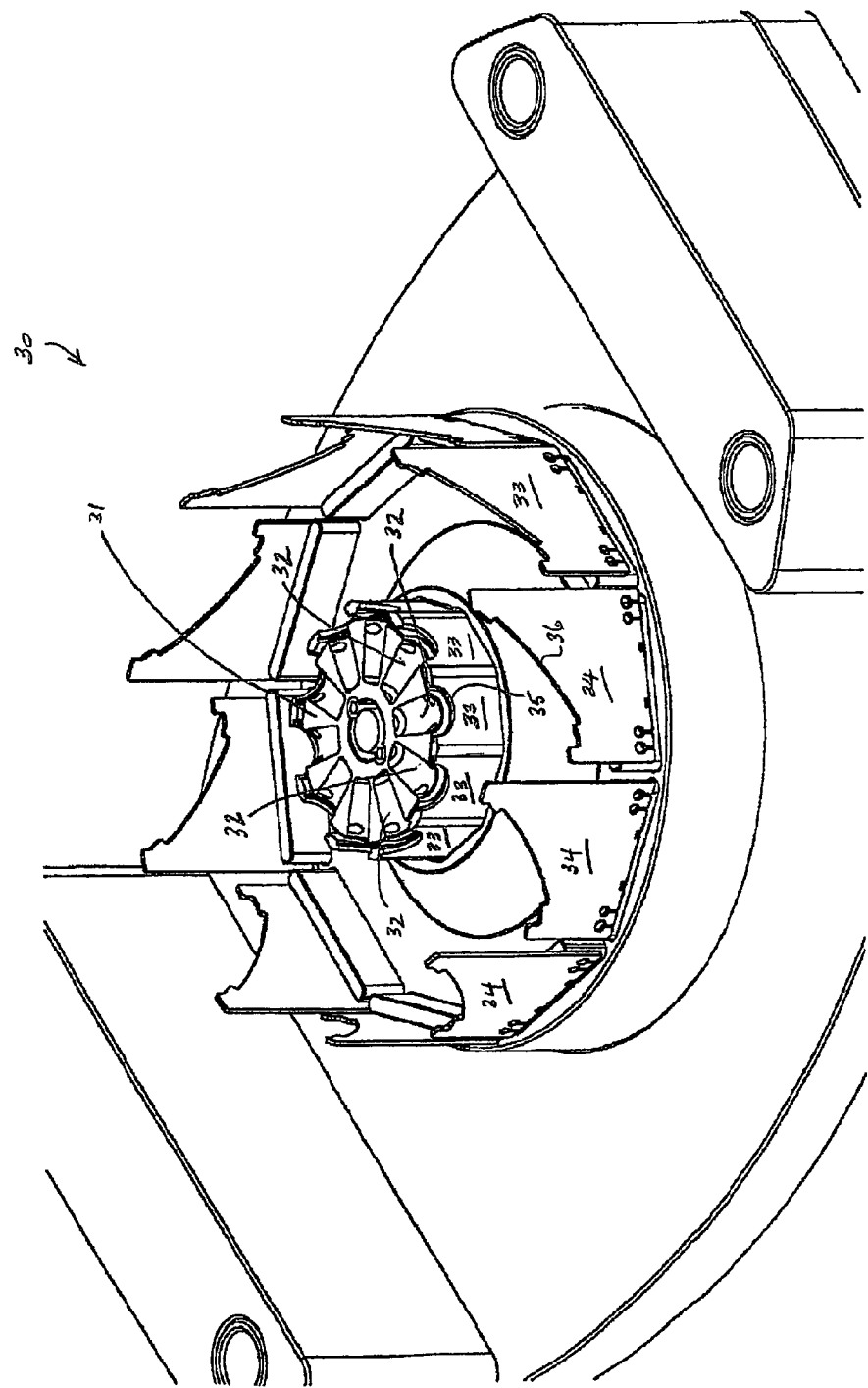
FIG. 5 is a perspective view of a jig and injection moulding tool used to manufacture the fan of FIG. 1.
Figure 6:
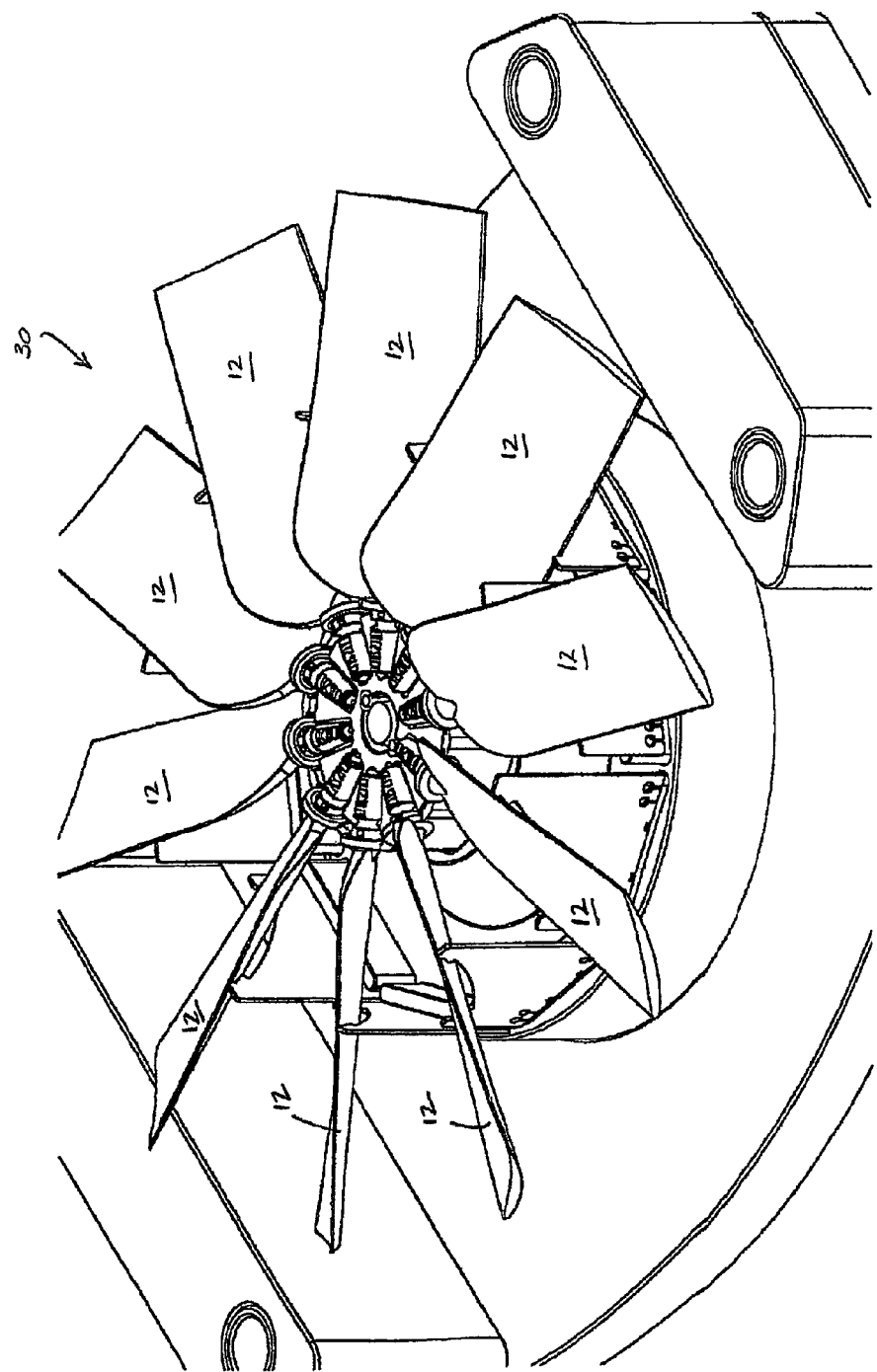
FIG. 6 is a perspective view of the jig and injection moulding tool of FIG. 5 upon assembly of the fan blades.

In the manufacture of a fan in accordance with this embodiment of the invention, the fan blades are assembled in a jig 30 with the inner blade ends 16 extending into appropriately formed openings in an injection moulding tool 31 defining the hub. The orientation of the blades relative to the jig 30 and the moulding tool 31 is fixed such that the pitch angle and diameter of the fan is predetermined. The key 17 on the end of each blade 12 securely and positively fits a mating cavity 32 in the injection moulding tool 30 such that each individual blade sits in the assembly at exactly the same angle. Details of the jig 30 and moulding tool 31 prior to assembly of the fan blades are illustrated in FIG. 5. FIG. 6 illustrates the jig and moulding tool once the fan blades have been assembled.

In addition to mounting the moulding tool 31, the jig 30 includes a blade support member 33 and a blade orientation member 34 associated with each mating cavity 32 provided in the injection moulding tool 30. In this embodiment, both the blade support member and blade orientation member are substantially planar members. The blade support member 33 includes a circular cutaway profile 35 for supporting the inner blade ends 16 so that the key 17 projects into a corresponding mating cavity 32 in the injection moulding tool 30. The blade orientation member 34 includes a blade support face 36 acting to support and orient the fan blade at a desired blade pitch angle.

Once the plurality of blades 12 are assembled with the moulding tool 31, synthetic plastics material is injected into the tool and allowed to cure or set. The synthetic plastics material flows through the tool cavities 32 defining the hub 14 so as to thoroughly encase and bond with the keys 17 engaged within the tool. When the plastics material has cured or set, the tool is opened to release the formed fan comprising the integral hub 14 and blades 12.

It will be appreciated that, in other embodiments of the invention, different construction techniques may be used. For example, in one embodiment, individual fan blades are identical and the variation in pitch blade angle is achieved by using different jigs or different blade orientation members to support the fan blades at the predetermined different angles for different fan structures. In another embodiment, a fan having a different blade pitch angle will require different blade forms to achieve that result.

It will also be appreciated that different forms of keys and/or key apertures may be used on the ends of the individual blades 12 in order to secure the blades in the desired relative position in the hub 14. It is important that the key is designed to prevent relative rotation of the blade about its axis in use as well as ensuring the blade is not dislodged from its engagement with the hub.

Figure 7:
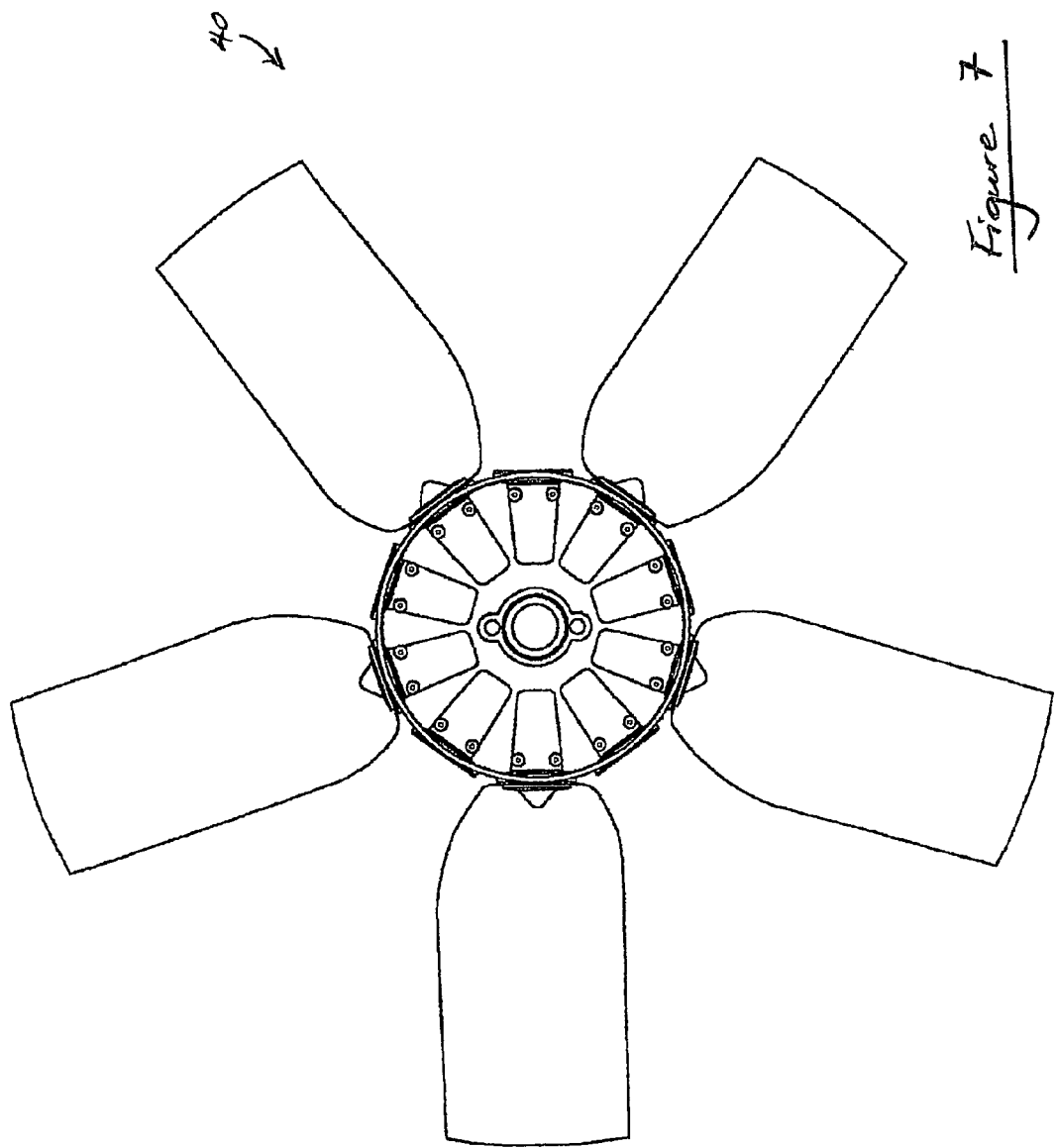
FIGS. 7 and 8 are plan views of 2 different fans made using the jig and injection moulding tool of FIG. 5.
Figure 8:
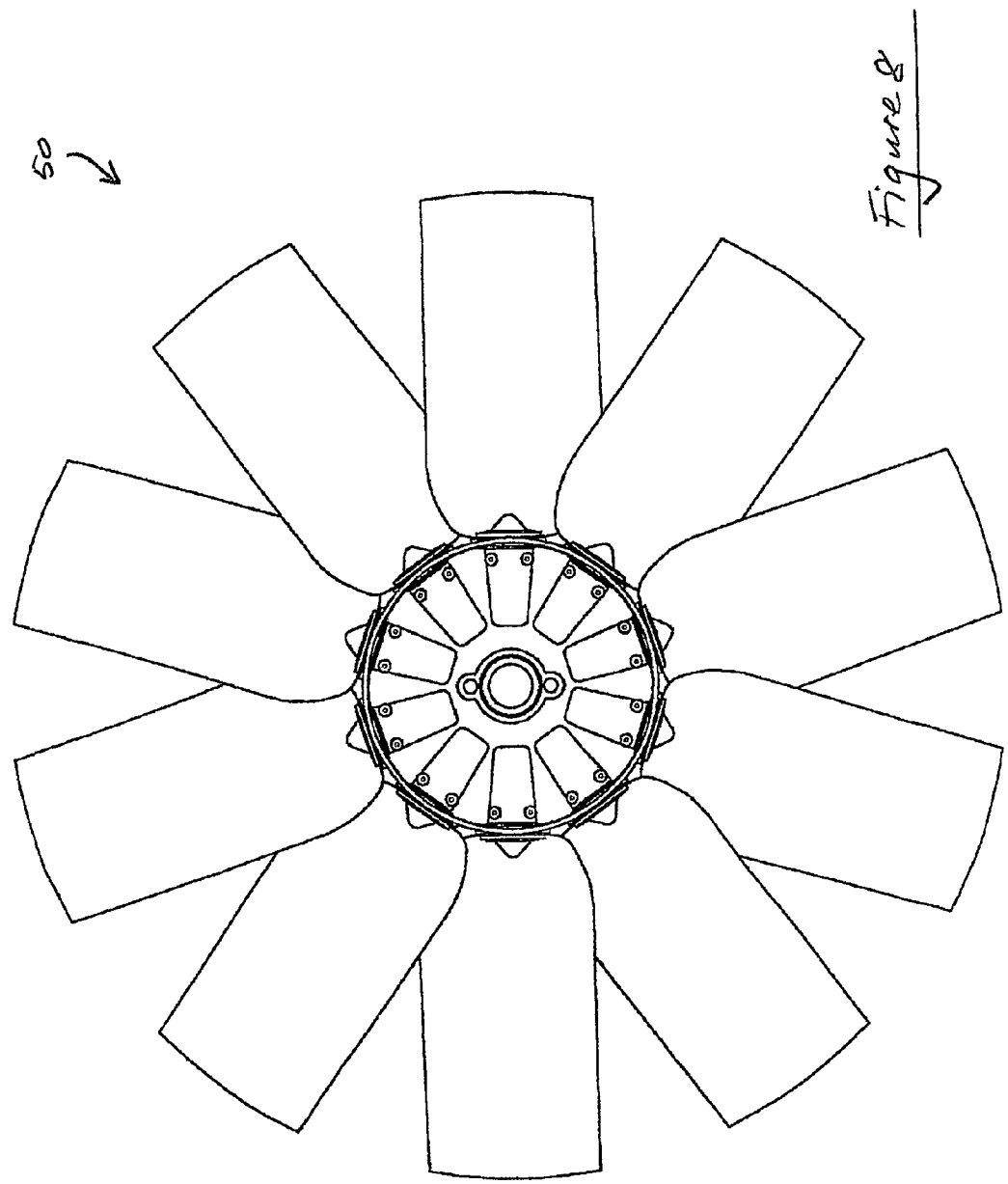

It will also be appreciated that a single injection moulding tool may be used to form fans having different numbers of blades. For example, a tool designed to have a maximum of 12 blades may also be used to produce a fan having three, four, six and twelve blades. Examples of fans having five and ten blades, both of which have been produced with the same injection moulding tool 30, are referenced 40 and 50 in FIGS. 7 and 8. Those cavities which are unused in the construction of a fan having less than the maximum number of blades can be blanked or may be fitted with a dummy key.

The manufacture of a fan in accordance with the method of the present invention produces an efficient, low cost fan of extreme variability with a low capital outlay.

Many modifications may be made in the design and construction of a fan in accordance with the invention and modifications may made to the method of manufacture of a fan in accordance with the invention and all such modifications which come within the scope of the invention shall be deemed to be within the ambit of the above description.

The invention claimed is:

1. A method of manufacturing a fan from a plurality of fan blades, comprising the steps of:

providing an injection moulding tool which defines a fan hub section;

assembling a predetermined number of preformed fan blades with the injection moulding tool so that inner ends of said blades extend into moulding cavities within the tool, injecting synthetic plastics material into the tool, and allowing the injected material to cool or cure to thereby form a moulded hub with the inner ends of the blades bonded therein.

2. A method according to claim 1, wherein the blades are preformed by moulding from synthetic plastics material.

3. A method according to claim 1, wherein the blades are formed with a predetermined pitch angle and length defining desired fan characteristics.

4. A method according to claim 3, wherein the inner ends of the preformed blades are received in a fixed orientation within the injection moulding tool, the blade shape defining a blade pitch angle and diameter of the fan.

5. A method according to claim 1, wherein the fan blades are preformed and assembled with the injection moulding tool in such a way that the blade orientation is able to be adjusted relative to the tool to define a predetermined pitch angle.

6. A method according to claim 1, wherein a jig is used to receive the injection moulding tool and the assembled blades, the jig determining the particular pitch angle for a particular fan design.

7. A method according to claim 6, wherein the jig includes a plurality of blade orientation members to orient each blade is a desired pitch angle with respect to the injection moulding tool.

8. A method according to claim 7, wherein the jig includes a plurality of blade support members to support each blade inner end in fixed relation to the injection moulding tool.

9. A method according to claim 7, wherein the inner end of each blade is shaped to be received within the injection moulding tool and to be keyed into the hub section, when formed, to securely support and retain the blade in the predetermined position.

10. An injection moulding tool for use in a method according to claim 1, the tool defining the fan hub section and including moulding cavities for receiving the inner ends of the blades.

11. A jig for use in a method according to claim 1, the jig acting to support the injection moulding tool and including members for supporting and/or orienting the fan blade in relation to the injection moulding tool.

12. A jig according to claim 11, wherein the members include blade support members for supporting the fan blades in fixed relation to the injection moulding tool.

13. A jig according to claim 11, wherein the members include blade orientation members for orienting the fan blades in a desired pitch angle with respect to the injection moulding tool.

14. A fan comprising a plurality of fan blades inner ends of which are bonded within and encapsulated by a hub section formed by injection moulding of synthetic plastics material, the pitch angle of the blades being selected as desired prior to encapsulation, the inner end of each blade being formed with a key structure which engages in a mating cavity in an injection moulding tool forming the hub section.

15. A fan according to claim 14, wherein the blades are preformed with a predetermined pitch angle and/or length so as to define predetermined characteristics of the fan.

16. A fan according to claim 14, wherein the key structure locates the blade in a predetermined position and each individual blade sits in assembly with the injection moulding tool at a same predetermined angle.

17. A fan according to claim 14, wherein variation of blade pitch angle is provided by having a plurality of different blade forms for each desired angle and fan diameter.

* * * * *